US008463300B2

(12) United States Patent
Chun et al.

(10) Patent No.: US 8,463,300 B2
(45) Date of Patent: Jun. 11, 2013

(54) PAGING INFORMATION TRANSMISSION METHOD FOR EFFECTIVE CALL SETUP

(75) Inventors: Sung-Duck Chun, Gyeonggi-Do (KR);
Young-Dae Lee, Gyeonggi-Do (KR);
Sung-Jun Park, Gyeonggi-Do (KR);
Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 12/602,762

(22) PCT Filed: Jun. 18, 2008

(86) PCT No.: PCT/KR2008/003465
§ 371 (c)(1),
(2), (4) Date: Dec. 2, 2009

(87) PCT Pub. No.: WO2008/156308
PCT Pub. Date: Dec. 24, 2008

(65) Prior Publication Data
US 2010/0178941 A1    Jul. 15, 2010

Related U.S. Application Data

(60) Provisional application No. 60/944,785, filed on Jun. 18, 2007.

(30) Foreign Application Priority Data

Jun. 18, 2008    (KR) .................. 10-2008-0057279

(51) Int. Cl.
*H04W 88/02* (2009.01)
(52) U.S. Cl.
USPC ........................................ 455/458

(58) Field of Classification Search
USPC .............. 455/458, 439, 574, 423, 411, 404.1, 455/552.1; 370/328, 329, 350; 709/224, 201, 709/246
See application file for complete search history.

(56) References Cited

U.S. PATENT DOCUMENTS

| 4,205,200 | A  | 5/1980  | Parikh et al. |
| 5,588,009 | A  | 12/1996 | Will          |
| 6,233,430 | B1 | 5/2001  | Helferich     |
| 6,324,171 | B1 | 11/2001 | Lee et al.    |
| 6,526,027 | B1 | 2/2003  | Yeom          |

(Continued)

FOREIGN PATENT DOCUMENTS

| CN | 1719932 | 1/2006 |
| CN | 1731887 | 2/2006 |

(Continued)

OTHER PUBLICATIONS

IPWireless, "Contention Resolution in Non-synchronous RACH Access", R2-062269, RAN2 #54, Aug. 2006.

(Continued)

*Primary Examiner* — Diane Mizrahi
(74) *Attorney, Agent, or Firm* — Lee, Hong, Degerman, Kang & Waimey (57) ABSTRACT

Disclosed is the method for transmitting paging information in wireless communication system, a core network transmits a paging message including call related information and/or terminal related information, at least one of a network or terminal performs a next operation based on the paging message, thereby effectively minimizing call setup time.

13 Claims, 6 Drawing Sheets

U.S. PATENT DOCUMENTS

| | | |
|---|---|---|
| 6,567,409 B1 | 5/2003 | Tozaki et al. |
| 6,725,267 B1 | 4/2004 | Hoang |
| 6,785,256 B2 | 8/2004 | O'Neill |
| 6,795,419 B2 | 9/2004 | Parantainen et al. |
| 7,039,425 B1 * | 5/2006 | Mazawa et al. ............ 455/456.4 |
| 7,245,707 B1 | 7/2007 | Chan |
| 7,373,148 B2 | 5/2008 | Kim et al. |
| 7,443,813 B2 | 10/2008 | Hwang et al. |
| 7,525,908 B2 | 4/2009 | Olsson et al. |
| 7,551,643 B2 | 6/2009 | Yeo et al. |
| 7,606,370 B2 * | 10/2009 | Lillie et al. .................... 380/278 |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju |
| 2001/0034791 A1 | 10/2001 | Clubb et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 | 1/2004 | Lim et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0147269 A1 | 7/2004 | Kim |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0165045 A1 | 7/2006 | Kim et al. |
| 2006/0187846 A1 | 8/2006 | Pelletier et al. |
| 2006/0195540 A1 * | 8/2006 | Hamilton et al. .............. 709/206 |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041349 A1 | 2/2007 | Kim et al. |
| 2007/0041382 A1 | 2/2007 | Vayanos et al. |
| 2007/0047452 A1 | 3/2007 | Lohr et al. |
| 2007/0047582 A1 | 3/2007 | Malkamäki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 * | 10/2008 | Wang et al. ................... 370/356 |
| 2008/0267126 A1 | 10/2008 | Vujcic et al. |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |
| 2008/0287091 A1 | 11/2008 | Suzuki et al. |
| 2008/0310452 A1 | 12/2008 | Vedantham et al. |
| 2008/0316959 A1 | 12/2008 | Bachl et al. |
| 2009/0005051 A1 * | 1/2009 | Voyer et al. ................... 455/445 |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |

| | | | | | | |
|---|---|---|---|---|---|---|
| 2009/0092076 | A1 | 4/2009 | Zheng et al. | WO | 2006/011763 | 2/2006 |
| 2009/0109912 | A1 | 4/2009 | DiGirolamo et al. | WO | 2006018670 | 2/2006 |
| 2009/0124259 | A1 | 5/2009 | Attar et al. | WO | 2006/049441 | 5/2006 |
| 2009/0143074 | A1 | 6/2009 | Pelletier et al. | WO | 2006/075820 | 7/2006 |
| 2009/0163199 | A1 | 6/2009 | Kazmi et al. | WO | 2006104344 | 10/2006 |
| 2009/0181710 | A1 | 7/2009 | Pani et al. | WO | 2006109851 | 10/2006 |
| 2009/0207771 | A1 | 8/2009 | Lindskog et al. | WO | 2006/116620 | 11/2006 |
| 2009/0239538 | A1 | 9/2009 | Motegi et al. | WO | 2007/025138 | 3/2007 |
| 2009/0264164 | A1 | 10/2009 | Chun et al. | WO | 2007052888 | 5/2007 |
| 2009/0318170 | A1 | 12/2009 | Lee et al. | WO | 2007/078929 | 7/2007 |
| 2010/0027413 | A1 | 2/2010 | Park et al. | WO | 2007078155 | 7/2007 |
| 2010/0046384 | A1 | 2/2010 | Lee et al. | WO | 2007078172 | 7/2007 |
| 2010/0061330 | A1 | 3/2010 | Hanov | WO | 2007133034 | 11/2007 |
| 2010/0067495 | A1 | 3/2010 | Lee et al. | WO | 2008/042889 | 4/2008 |
| 2010/0075635 | A1* | 3/2010 | Lim et al. ............... 455/411 | WO | 2008/054103 | 5/2008 |
| 2010/0128669 | A1 | 5/2010 | Chun et al. | WO | 2008/111684 | 9/2008 |
| 2010/0137016 | A1* | 6/2010 | Voyer ................ 455/522 | WO | 2009/084998 | 7/2009 |
| 2010/0165901 | A1 | 7/2010 | Kim | | | |
| 2010/0195568 | A1* | 8/2010 | Iimori ................ 370/328 | OTHER PUBLICATIONS | | |
| 2010/0227614 | A1 | 9/2010 | Chun et al. | | | |
| 2010/0238799 | A1 | 9/2010 | Sebire | LG Electronics, "Discussion on Message 4 in Random Access", R2-070519, 3GPP TSG-RAN WG2 #57, Feb. 2007. | | |
| 2010/0238903 | A1 | 9/2010 | Kitazoe | | | |
| 2010/0254340 | A1 | 10/2010 | Park et al. | LG Electronics, "Discussion on Message 4 in Random Access", R2-071456, 3GPP TSG-RAN WG2 #57bis, Mar. 2007. | | |
| 2010/0265896 | A1 | 10/2010 | Park et al. | | | |
| 2010/0272004 | A1 | 10/2010 | Maeda et al. | LG Electronics, "Discussion on Message 4 in Random Access", R2-071923, 3GPP TSG-RAN WG2 #58, May 2007. | | |
| 2010/0309877 | A1 | 12/2010 | Damnjanovic et al. | | | |
| 2011/0039536 | A1 | 2/2011 | Lee et al. | LG Electronics, "Multi-level DRX Operation in CELL_PCH", R2-071930, 3GPP TSG-RAN WG2 #58, May 2007. | | |
| 2011/0090836 | A1 | 4/2011 | Mochizuki et al. | | | |
| 2011/0116436 | A1 | 5/2011 | Bachu et al. | NEC, "Fast setup for PS services (CELL PCH & URA PCH)", R2-062328, 3GPP TSG-RAN2 Meeting #54, Aug. 2006. | | |
| 2011/0182243 | A1* | 7/2011 | Gallagher et al. .......... 370/328 | | | |
| 2011/0207427 | A1* | 8/2011 | Kitani et al. ................ 455/404.1 | Sammour, M.; "Method and System for Enhancing Discontinuous Reception in Wireless Systems"; U.S. Appl. No. 60/863,185, filed Oct. 27, 2006. | | |
| 2011/0261743 | A1* | 10/2011 | Futaki et al. ................ 370/312 | | | |
| 2012/0002589 | A1 | 1/2012 | Saifullah et al. | | | |

FOREIGN PATENT DOCUMENTS

| | | |
|---|---|---|
| CN | 1835627 | 9/2006 |
| CN | 101682591 | 9/2012 |
| EP | 0889664 | 1/1999 |
| EP | 1148753 | 10/2001 |
| EP | 1168877 | 1/2002 |
| EP | 1209938 | 5/2002 |
| EP | 1304898 | 4/2003 |
| EP | 1315356 | 5/2003 |
| EP | 1318632 | 6/2003 |
| EP | 1337124 | 8/2003 |
| EP | 1372310 | 12/2003 |
| EP | 1511245 | 3/2005 |
| EP | 1517565 | 3/2005 |
| EP | 1720322 | 11/2006 |
| EP | 1720373 | 11/2006 |
| JP | 06-006294 | 1/1994 |
| JP | 2003-087180 | 3/2003 |
| JP | 2003-196775 | 7/2003 |
| JP | 2003-235064 | 8/2003 |
| JP | 2004-134904 | 4/2004 |
| JP | 2005-039726 | 2/2005 |
| JP | 2005057787 | 3/2005 |
| JP | 2005354488 | 12/2005 |
| JP | 2006067115 | 3/2006 |
| JP | 2006528456 | 12/2006 |
| JP | 2007165635 | 6/2007 |
| JP | 2009540721 | 11/2009 |
| JP | 2009542100 | 11/2009 |
| KR | 2001-0093687 | 10/2001 |
| KR | 20010105240 | 11/2001 |
| KR | 10-2003-0026924 | 4/2003 |
| KR | 20040039944 | 5/2004 |
| KR | 20040048675 | 6/2004 |
| KR | 20050008440 | 1/2005 |
| KR | 20050096763 | 10/2005 |
| RU | 2249917 | 4/2005 |
| WO | 0054521 | 9/2000 |
| WO | 00/74416 | 12/2000 |
| WO | 0074416 | 12/2000 |
| WO | 0105050 | 1/2001 |
| WO | 0239622 | 5/2002 |
| WO | 2004043099 | 5/2004 |
| WO | 2004064272 | 7/2004 |
| WO | 2006/000876 | 1/2006 |

LG Electronics, Inc., "PDCP Retransmissions," 3GPP TSG-RAN WG2 #59, R2-073041, XP-050135778, Aug. 19, 2007.

LG Electronics, Inc., "PDCP Structure and Traffic Path," 3GPP TSG-RAN WG2 #59, R2-073259, XP-050135985, Aug. 20, 2007.

LG Electronics, Inc., "Contents of PDCP Status Report," 3GPP TSG-RAN WG2 #59, R2-07xxxx, XP-002580785, Oct. 8, 2007.

Ericsson, "MAC header for Improved L2 support for high data rates," R2-070810, 3GPP TSG-RAN WG2#57, Feb. 2007, XP-050133836.

ASUSTeK, "Granularity Consideration for Variable RLC PDU Sizes," R2-070336, 3GPP TSG-RAN WG2 Meeting #56 bis, Jan. 2007, XP-050133423.

3rd Generation Partnership Project (3GPP), "Technical Specification Group Radio Access Network; Medium Access Control (MAC) Protocol Specification (Release 7)," 3GPP TS 25.321, v7.4.0, Mar. 2007, XP-050367709.

Y. Gao et al., "Research on the Access Network and MAC Technique for Beyond 3G Systems," IEEE Wireless Communications, Apr. 2007, XP-011184637.

Nokia, "Active mode DRX details," R2-062753, 3GPP TSG-RAN WGx Meeting #55, Oct. 2006, XP-002437990.

NTT DoCoMo, Inc., "Views on DRX/DTX control in LTE," R2-063397, 3GPP TSG RAN WG2 #56, Nov. 2006.

Email Rapporteur (Nokia), "DRX in E-UTRAN," R2-070463, 3GPP TSG-RAN WG2 Meeting #57, Feb. 2007.

Ericsson, "Initial Random Access Procedure for E-UTRAN", Tdoc R2-062853, 3GPP TSG-RAN WG2 #55, Oct. 2006.

Samsung, "LTE Random access procedure", R2-062258, 3GPP TSG RAN2#54, Sep. 2006.

Siemens, "Initial Access Procedure", R2-061931, 3GPP TSG-RAN WG2 LTE AdHoc Meeting, Jun. 2006.

IPWIRELESS, "Contention Resolution in Non-synchronous RACH Access", Tdoc R2-062269, RAN2#54, Sep. 2006.

Bosch, "Header Compression Signalling," TSGR2#9(99)i32, TSG-RAN Working Group 2 (Radio Layer 2 and Radio Layer 3), Nov. 1999, XP-050114120.

3rd Generation Partnership Project (3GPP), "Technical Specification Group Radio Access Network; Packet Data Convergence Protocol (PDCP) Specification (Release 7)," 3GPP TS 25.323, v7.4.0, Mar. 2007, XP-050367856.

NTT Docomo, Inc., "E-mail Discussion on U-plane ciphering location for LTE", R2-071293, 3GPP TSG RAN WG2#57bis, Mar. 2007.

LG Electronics, "U-plane ciphering at MAC/Physical Layer", R2-071550, 3GPP TSG RAN WG2#57bis, Mar. 2007.

LG Electronics Inc., "Relative Buffer Status Reporting," 3GPP TSG-RAN WG2 Meeting #46bis, R2-050852, Apr. 2005.

IP Wireless, "Layer 2 Functions for LTE," 3GPP TSG RAN WG2 #48bis, R2-052377, Oct. 2005.

Samsung, "Re-use of PDCP SN at ARQ Level?," 3GPP TSG-RAN2 Meeting #53bis, R2-061829, Jun. 2006.

Panasonic, "MAC PDU Format for LTE," 3GPP TSG RAN WG2 #56bis, R2-070096, Jan. 2007.

Samsung, "Selective Forwarding/Retransmission During HO," 3GPP TSG-RAN2 Meeting #56bis, R2-070130, Jan. 2007.

Nokia, "Requirements for Redirection in E-UTRAN," 3GPP TSG-RAN WG2 Meeting #56-bis, R2-070107, Jan. 2007.

NTT Docomo, Inc., "MAC PDU Structure for LTE", 3GPP TSG RAN WG2 #56bis, R2-070280, XP-050133369, Jan. 15, 2007.

Catt, et al., "Enhancement to Buffer Status Reporting", 3GPP TSG RAN WG2 #57bis, R2-071345, XP-050134291, Mar. 26, 2007.

Nokia Corp., "MAC Header Format," 3GPP TSG-RAN WG2 Meeting #59 bis, R2-073891, Oct. 2007, XP-002602993.

LG Electronics Inc., "Support for VoIP over MAC-hs/ehs," 3GPP TSG-RAN WG2 Meeting #57 bis, R2-071542, Mar. 2007, XP-050134474.

Alcatel-Lucent, "DL Control Signaling and Multiplexing for VoIP," 3GPP TSG-RAN WG1 Meeting #48 bis, R1-071721, Mar. 2007, XP-002460800.

3rd Generation Partnership Project (3GPP); "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.

LG Electronics Inc., "UL Timing Control Related to Contention Resolution," R2-081607, 3GPP TSG-RAN WG2 #61 bis, Mar. 2008, XP-050139334.

Korean Intellectual Property Office Application Serial No. 10-2007-0012749, Notice of Allowance dated Jan. 18, 2013, 2 pages.

In the USPTO U.S. Appl. No. 12/438,523, Final Office Action dated Jan. 22, 2013, 11 pages.

Samsung, "LTE Handover procedures, text proposal," R2-061338, 3GPP TSG-RAN3 Meeting #53, May 2006, XP-050131278.

Samsung, "UL Timing Sync Procedure," R2-0601006, 3GPP TSG RAN2 #52, Mar. 2006, XP-002434793.

European Patent Office Application Serial No. 07793615.1, Search Report dated Feb. 18, 2013, 7 pages.

Korean Intellectual Property Office Application Serial No. 10-2007-0081356, Notice of Allowance dated Feb. 28, 2013, 2 pages.

Qualcomm Europe, "Open Issues in random access procedure," R2-063034, 3GPP TSG-RAN WG2 #55, Oct. 2006, 2 pages.

Taiwan Intellectual Property Office Application Serial No. 096140865, Office Action dated Feb. 6, 2013, 6 pages.

European Patent Office Application Serial No. 07833694.8, Search Report dated Mar. 1, 2013, 8 pages.

European Patent Office Application Serial No. 07833143.6, Search Report dated Mar. 5, 2013, 10 pages.

\* cited by examiner

PAGING INFORMATION TRANSMISSION METHOD FOR EFFECTIVE CALL SETUP

CROSS-REFERENCE TO RELATED APPLICATIONS

This application is the National Stage filing under 35 U.S.C. §371 of International Application No. PCT/KR2008/003465, filed on Jun. 18, 2008, which claims the benefit of earlier filing date and right of priority to Korean Application No. 10-2008-0057279, filed on Jun. 18, 2008, and also claims the benefit of U.S. Provisional Application Ser. No. 60/944,785, filed on Jun. 18, 2007.

TECHNICAL FIELD

The present invention relates to a wireless (radio) communication system for transmitting a paging information, and more particularly, to a method for transmitting the paging information by transferring information related to a call setup from a core network to a base station, thereby effectively minimizing call setup time

BACKGROUND ART

Figure 1:
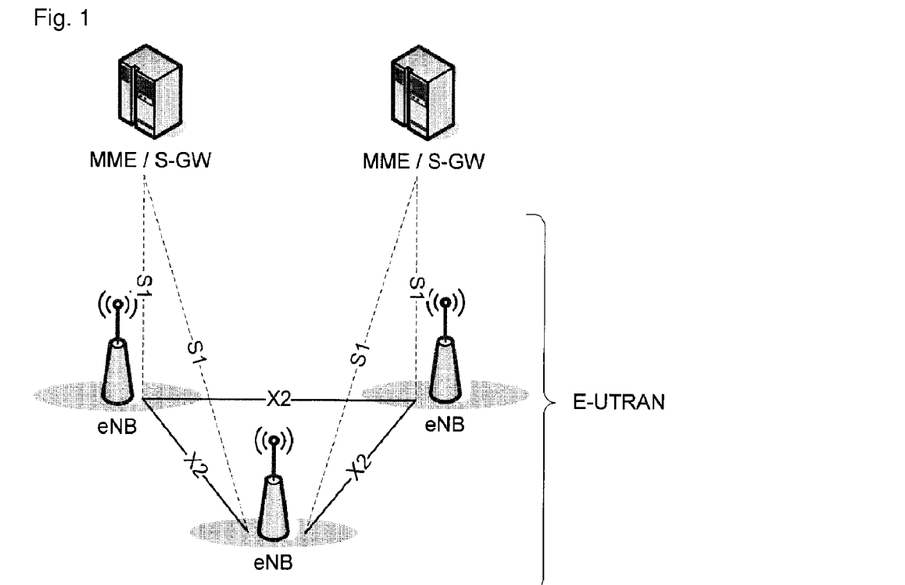
FIG. 1 shows an exemplary network structure of an Evolved Universal Terrestrial Radio Access Network (E-UTRAN) as a mobile communication system to which a related art and the present invention are applied.

FIG. 1 shows an exemplary network structure of an Evolved Universal Mobile Telecommunications System (E-UMTS) as a mobile communication system to which a related art and the present invention are applied. The E-UMTS system is a system that has evolved from the UMTS system, and its standardization work is currently being performed by the 3GPP standards organization. The E-UMTS system can also be referred to as a Long-Term Evolution (LTE) system.

The E-UMTS network can roughly be divided into an Evolved Universal Terrestrial Radio Access Network (E-UTRAN) and a Core Network (CN). The E-UTRAN generally comprises a terminal (i.e., User Equipment (UE)), a base station (i.e., eNode B), and an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

Radio interface protocol layers between the terminal and the network can be divided into a first layer (L1), a second layer (L2) and a third layer (L3) based on three lower layers of an Open System Interconnection (OSI) standard model widely known in communications systems. A physical layer belonging to the first layer provides an information transfer service using a physical channel. A Radio Resource Control (RRC) layer located at the lowest portion of the third layer controls radio resources between the terminal and the network. For this purpose, the RRC layer allows RRC messages to be exchanged between the terminal and the network.

Figure 2:
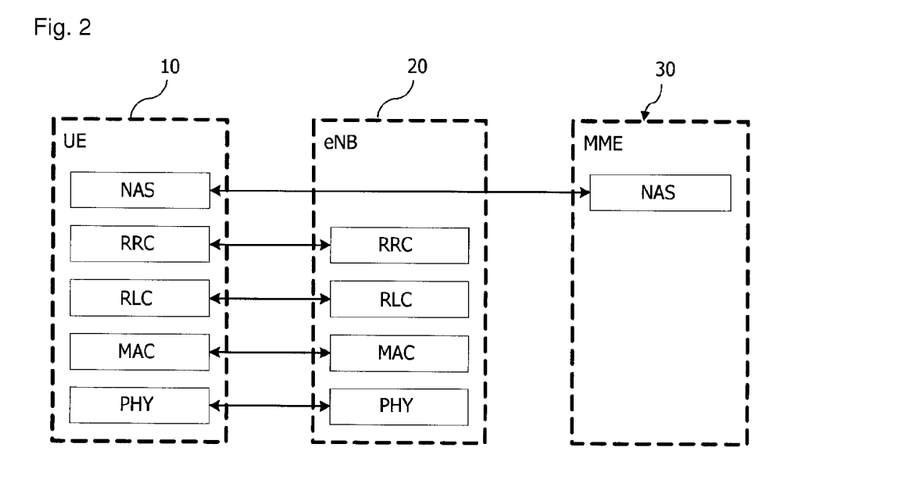
FIG. 2 shows a radio interface protocol architecture in a control plane between a terminal and a Evolved UMTS Terrestrial Radio Access Network (E-UTRAN) based on 3GPP radio access network standards.
Figure 3:
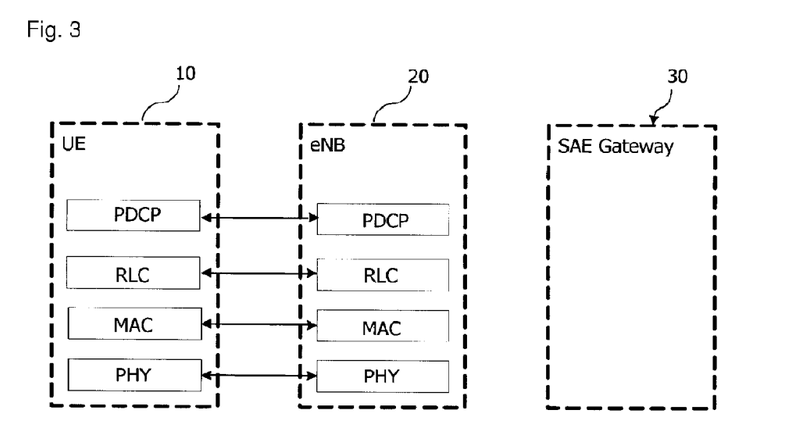
FIG. 3 shows a radio interface protocol architecture in a user plane between a terminal and a Evolved UMTS Terrestrial Radio Access Network (E-UTRAN) based on 3GPP radio access network standards.

FIGS. 2 and 3 show radio interface protocol architecture between a terminal and E-UTRAN based on 3GPP radio access network standards. Particularly, FIG. 2 shows radio protocol architecture in a control plane, and FIG. 3 shows radio protocol architecture in a user plane.

The radio interface protocol in FIGS. 2 and 3 has horizontal layers comprising a physical layer, a data link layer and a network layer, and has vertical planes comprising a user plane for transmitting user traffic and a control plane for transmitting control signals. The protocol layers in FIGS. 2 and 3 can be divided into a first layer (L1), a second layer (L2) and a third layer (L3) based on three lower layers of an Open System Interconnection (OSI) standard model widely known in communications systems. Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN. If an RRC connection is established between the RRC layer of the terminal and the RRC layer of the radio network, the terminal is in the RRC connected mode. Otherwise, the terminal is in an RRC idle mode.

A Non-Access Stratum (NAS) layer located at an upper portion of the RRC layer performs functions, such as session management, mobility management and the like.

One cell constructing an eNB is set to one of bandwidths of 1.25 MHz, 2.5 MHz, 5 MHz, 10 MHz, 20 MHz and the like, so as to provide downlink or uplink transmission services to multiple terminals. Here, different cells may be set to provide different bandwidths.

Downlink transport channels for transmitting data from a network to a terminal may comprise a Broadcast Channel (BCH) for transmitting system information, a Paging Channel (PCH) for transmitting paging messages and a downlink Shared Channel (SCH) for transmitting other user traffic or control messages. Traffic or control messages of a downlink point-to-multipoint service (multicast or broadcast service) may be transmitted either via a downlink SCH, or via a separate downlink Multicast Channel (MCH). In addition, uplink transport channels for transmitting data from a terminal to a network may comprise a Random Access Channel (RACH) for transmitting an initial control message and an uplink Shared Channel (SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a MBMS point-to-multipoint Control Channel/Multicast Control Channel (MCCH), a MBMS point-to-multipoint Traffic Channel/Multicast Traffic Channel (MTCH), and the like.

Figure 4:
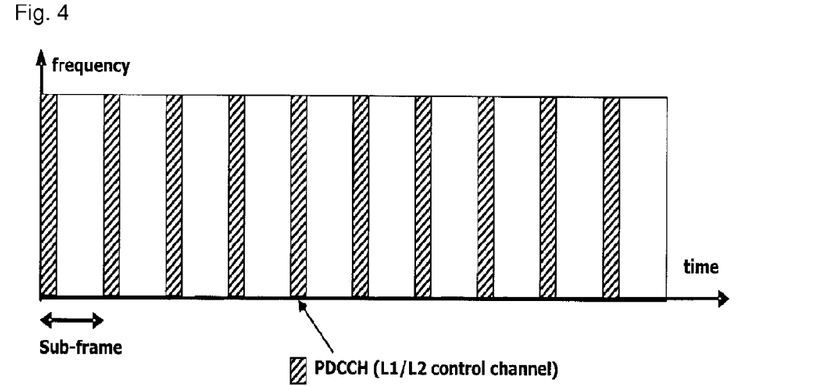
FIG. 4 shows an exemplary view of a related art physical channel structure for control channel transmission.

FIG. 4 shows a transmission on a control channel according to the related art.

A physical channel is composed of multiple sub-frames arranged on a time axis and multiple sub-carriers arranged on a frequency axis. Here, a single sub-frame includes a plurality of symbols on the time axis. One sub-frame is composed of a plurality of resource blocks, each of which includes a plurality of symbols and a plurality of sub-carriers. Also, each sub-frame can use particular sub-carriers of particular symbols (e.g., a first symbol) at the corresponding sub-frame for a Physical Downlink Control Channel (PDCCH), namely, a L1/L2 control channel. One sub-frame is a time duration of 0.5 ms. A Transmission Time Interval (TTI) as a unit time for which data is transmitted is 1 ms corresponding to two sub-frames.

Figure 5:
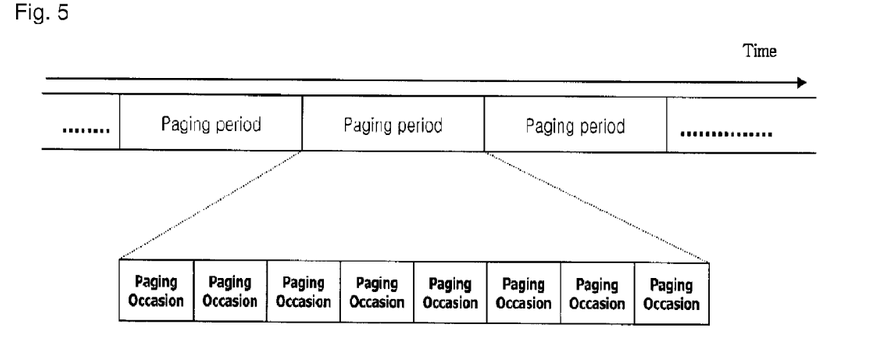
FIG. 5 shows an exemplary view of a related art channel structure for a paging channel transmission.

FIG. 5 shows an exemplary view of a related art channel structure for a paging channel transmission. In general, a terminal may perform a DRX (Discontinuous Reception) operation in order to reduce power consumption by the terminal when it receives a paging message. To do this, a network configures a plurality of paging occasion for every time period, which so called a paging DRX cycle, and a particular terminal can obtain the paging message by receiving a particular paging occasion. Here, the terminal does not receive any paging channel within any other time except the particular paging occasion and the paging occasion is corresponding to a TTI (Transmission Time Interval).

Figure 6:
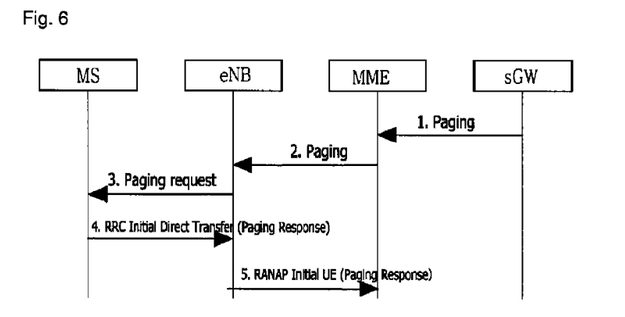
FIG. 6 shows an exemplary paging process in a related art.

FIG. 6 shows an exemplary paging process in a related art. As illustrated in FIG. 6, a sGW (serving gateway) pages a MME (mobility management entity) when data or paging is received from an Internet network or PSTN (public switched transfer/telephone network). The MME configures a paging message and then transmits the paging message to an eNB. The eNB then transmit the paging message to a terminal (UE, MS). After the paging message received by the terminal, the terminal performs a RRC connection and transmits a NAS message. After that, the core network performs a call setup process with the terminal once the NAS message is received from the terminal.

As it can be seen from the paging process illustrated in FIG. 6, in related art, too many steps are existed for completing the paging process. In particular, the paging message that transmitted from the MME to the eNB only includes information related to a terminal identifier, a paging period, and the like. Therefore, even after the eNB receives a request for the RRC connection, the eNB does not exactly know which radio resource should be assigned to the terminal or which cell the terminal should be move.

Figure 7:
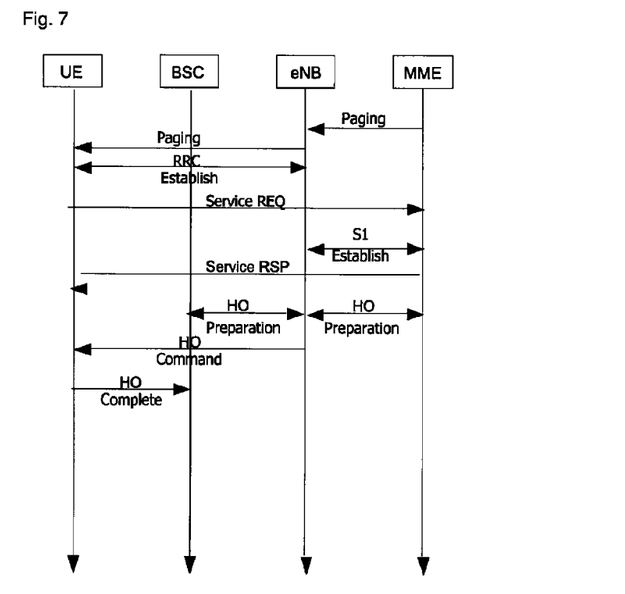
FIG. 7 shows another exemplary paging process in a related art.

FIG. 7 shows another exemplary paging process in a related art. As illustrated in FIG. 7, the paging message is transmitted from the MME to the eNB. After receiving the paging message, the eNB transmits the paging message to the UE, and then the UE transmits a NAS message to the MME after performing a RRC connection process. After receiving the NAS message, the MME establishes a S1 connection with the eNB, and then transmits a response in response to the NAS message. The eNB performs a handover preparation based on information received from the MME, and then transmits a handover command to the UE. After UE is moved to other cell according to the handover command, call setup process can be continued.

In related art, there are many steps existed in the paging process, thereby causing a complexity. Further, there is great drawback causing a delayed call setup because the eNB never receives any information related to the UE during the paging process in the related art.

DISCLOSURE OF INVENTION

Technical Solution

The present invention is to provide a method for transmitting a plurality of call setup related information from a core network to a plurality of network entities during the call setup process to a terminal, thereby efficiently and effectively minimizing call setup time.

To implement at least the above feature in whole or in parts the present invention may provide a method for transmitting paging information in wireless communication system, the method comprising: transmitting a paging message, wherein the paging message includes at least one of call related information and terminal related information, wherein at least one of a network or terminal performs a next operation based on the information included in the paging message.

The present invention may also provide a method for receiving paging information in wireless communication system, the method comprising: receiving a paging message by a terminal, wherein the paging message includes at least one of call related information and terminal related information, and performing a next operation based on the information included in the paging message.

Also, the present invention may provide a plurality of data fields that is included in a message when a network transmits the message to a terminal in wireless communication system, wherein the plurality of data fields are stored with at least one of an identifier of the terminal (UE id), a message type, the call related information and the terminal related information.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of the present invention is the recognition by the present inventors regarding the problems and drawbacks of the related art described above and explained in more detail hereafter. Based upon such recognition, the features of the present invention have been developed.

The present invention may be embodied in a 3GPP communication technology, in particular, in the Universal Mobile Telecommunications System (UMTS) system, a communication apparatus and method thereof. However, the present invention may also be applied to all wired/wireless communications to which the technical scope of the present invention can be applied.

Hereinafter, description of structures and operations of the preferred embodiments according to the present invention will be given with reference to the accompanying drawings.

Figure 8:
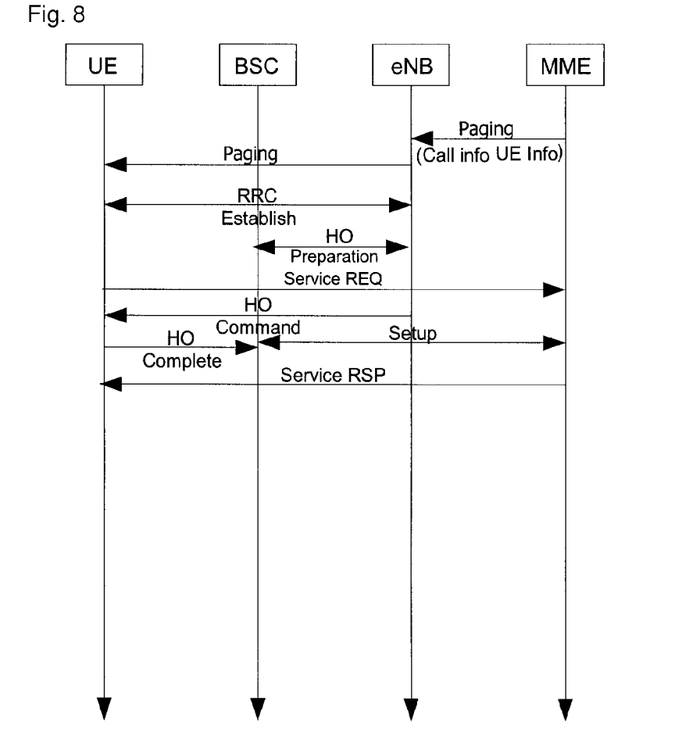
FIG. 8 shows an exemplary paging information transmission process according a first embodiment of the present invention.

FIG. 8 shows an exemplary paging information transmission process according a first embodiment of the present invention. As illustrated in FIG. 8, a paging message may be transmitted from a MME to an eNB. Here, the MME may transmit call related information and/or UE capability information to the eNB, and those information may be included in the paging message transmitting to the eNB. After receiving the paging message from the MME, the eNB may transmit the paging message to a UE. Then, the UE may perform a RRC connection (or RRC establishment) process. When the eNB receives a request of the RRC connection from the UE, the eNB may determine a radio resource allocation method based on the information included in the paging message that is transmitted from the MME. For example, the eNB may able to determine that the UE needs to be handover to a BSC (GSM) immediately. In this case, the eNB immediately perform a handover preparation after the determination. Meanwhile, the UE may transmit a NAS message to the MME. When the handover preparation is done, the eNB may transmit a handover command to the UE. During the handover process, the network connection between the BSC and the MME is setup. After that, the handover process is completed and the MME may transmit a NAS message response to the UE.

Here, the paging message that is transmitted from the MME may be configured or formed with a plurality of data fields. Therefore, the call related information and/or the UE capability information may be included in the plurality of data fields. Also, the plurality of data fields may includes a UE identifier (UE id), an identifier indicating a message type, and the like. The call related information may be related to a service type, quality of service (QoS) information, a target network radio technology, a target cell, etc. The UE capability related information may be related to a maximum supporting data rate, a buffer size, a maximum number of supporting data channels, a maximum transmission rate, etc.

The determination for the UE's handover may be decided by the eNB in various circumstances. For example, if data communicating with the UE only has a voice data, a handover to a BTS in a GSM system may be much needed rather than a handover to an eNB in a LTE system. Likewise, if data communicating with the UE only has a video call data, a handover to a RNC in a WCDMA system may be much needed rather that the handover to the eNB in the LTE system.

In FIG. 7, which illustrates a paging process in a related art, a eNB does not have information related to a UE or a call, as such the eNB may perform its own operations only after information between the UE and MME is exchanged each other. However, in FIG. 8, the eNB may able to perform the handover preparation as well as the RRC connection process simultaneously. Also, a connection setup between a radio network and a core network may be processed simultaneously while performing a network connection for a call or a bearer setup for a call. Thus, a call set up can be advantageously processed in effective manner with a minimized time.

Figure 9:
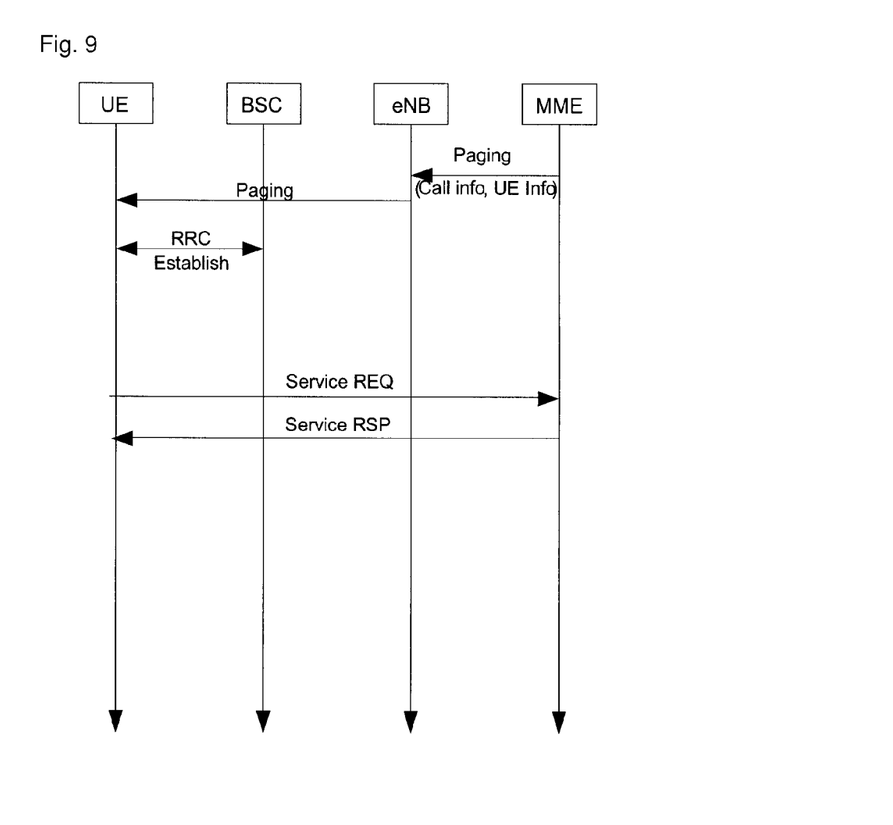
FIG. 9 shows an exemplary paging information transmission process according a second embodiment of the present invention.

FIG. 9 shows an exemplary paging information transmission process according a second embodiment of the present invention.

As illustrated in FIG. 9, a MME may transmit a paging message to an eNB. Here, the MME may transmit call related information or a UE capability related information to the eNB, and those information may be included in the paging message. The eNB may transmit the paging message to a UE via a network. The paging message transmitting to the UE via the network may include information indicating a cell, a radio technology, or radio network that the UE should select. After the UE receives the paging message, the UE may immediately perform a RRC connection. After this step, the UE may transmit a NAS message to the MME and the MME may transmit a NAS message response to the UE.

Figure 10:
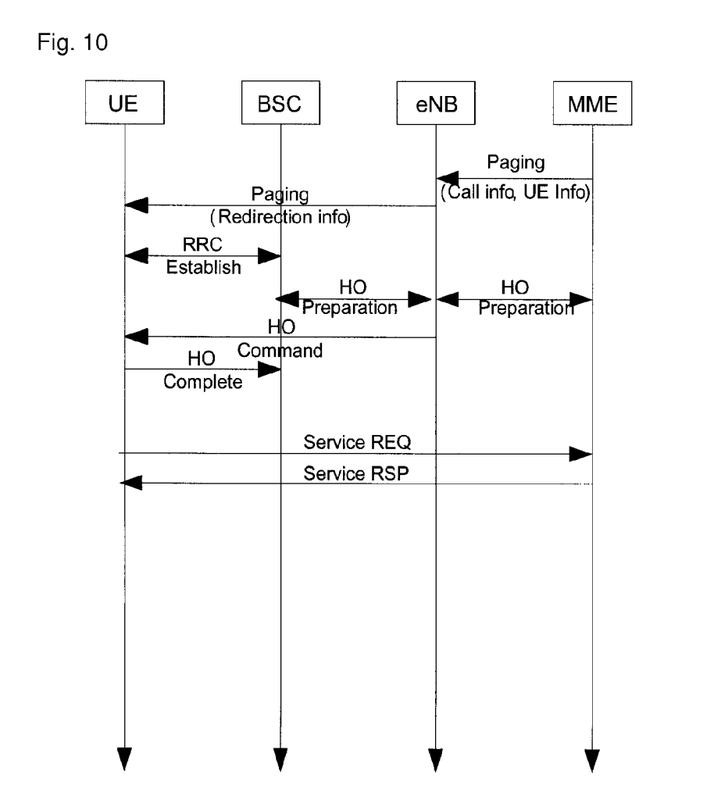
FIG. 10 shows an exemplary paging information transmission process according a third embodiment of the present invention.

FIG. 10 shows an exemplary paging information transmission process according a third embodiment of the present invention.

As illustrated in FIG. 10, a MME may transmit a paging message to an eNB. Here, the MME may transmit a call related information or a UE capability related information to the eNB, and those information may be included in the paging message. The eNB may transmit the paging message to a UE via a network. The paging message transmitting to the UE via the network may include information indicating a cell, a radio technology, or radio network that the UE should select. If the transmitting paging message includes information indicating that the UE needs to be moved to a GSM cell, when the UE receives the paging message, the UE may immediately move to the GSM cell and may perform a RRC connection instantly. During or after the RRC connection between the UE and the GSM cell, the eNB may perform a handover preparation for the UE and may transmit a handover command to the UE. After this step, the handover process may be completed, and the UE may transmit a NAS message to the MME and the MME may transmit a NAS message response to the UE.

As it can be seen from the FIG. 10, some of unnecessary steps in FIG. 7 can be eliminated because the call related information and/or the UE capability related information were included in the paging message. When the MME (or core network) transmits the paging message to the radio network (eNB or BSC), the paging message will be transmitted to all radio network that located in a particular area where a particular UE camped on. However, only one radio network will receive a response from the particular UE. As such, those radio networks that fail to receive the response may need to discard the call related information and/or the UE capability related information along with the paging message. Accordingly, the present invention may propose to include timer information during the transmission of the paging message. For example, when the radio network receives the paging message from the core network, the radio network may start to initiate the timer. Or, the radio network may start to initiate the timer when the paging message is transmitted to the UE by the radio network. If the radio network receives the response from the particular UE, then it stops the timer. However, if the radio network does not receive the response until the timer is expired, the radio network may discard the call related information and/or the UE capability related information, which was transmitted from the core network.

The present invention may propose to include radio technology information, radio network information, or cell related information, for a target cell that the UE will be camped on, into a paging message transmitting from a radio network to a UE. Also, if UE has its own identifier that is matched with an identifier included in the received paging message and UE has information for a radio technology, radio network, or a cell, which will be moved, the UE may response to the received paging message after the UE is moved based on the those information.

The present invention may provide a method for transmitting paging information in wireless communication system, the method comprising: transmitting a paging message, wherein the paging message includes at least one of call related information and terminal related information, wherein at least one of a network or terminal performs a next operation based on the information included in the paging message, wherein the paging message is transmitted by a core network, the core network is either a mobility management entity (MME) or a gateway (GW), the gateway is either serving gateway (sGW) or packet data network gateway (pGW), the network is at least one of an enhanced Node B (eNB), a base station controller (BSC), a radio network controller (RNC) and Node B (NB), the terminal related information is related to a function and/or capability that supported by the terminal, the call related information is related to at least one of a service type, QoS information, a target network radio technology, and a target cell, the terminal related information indicates a type of radio network technology that is supported by the terminal, the radio network technology is at least one of a GSM (Global System for Mobile communications), a UMTS (Universal Mobile Telecommunications System) and a LTE (Long Term Evolution), the terminal related information indicates a maximum uplink transmission rate or a maximum downlink transmission rate, the terminal related information indicates whether the terminal supports a voice service or a data service, the terminal related information indicates either a maximum amount of buffer in the terminal or a maximum number of channels supported by the terminal, the terminal related information indicates a radio resource support amount for a radio bearer setup between the terminal and the network, the paging message includes a plurality of fields to store at least one of the call related information and the terminal related information, the paging message includes an identifier of the terminal (UE id) or a message type.

It can be also said that the present invention may also provide a method for receiving paging information in wireless communication system, the method comprising: receiving a paging message by a terminal, wherein the paging message includes at least one of call related information and terminal related information, and performing a next operation based on the information included in the paging message, wherein the terminal related information is related to a function and/or capability that supported by the terminal, the terminal related information indicates a type of radio network technology that is supported by the terminal, a maximum uplink transmission rate or a maximum downlink transmission rate, the terminal related information indicates a maximum amount of buffer in the terminal, a maximum number of channels supported by the terminal or a radio resource support amount for a radio bearer setup between the terminal and the network, the call related information is related to at least one of a service type, QoS information, a target network radio technology, and a target cell, the paging message includes a plurality of fields to store at least one of an identifier of the terminal (UE id), a message type, the call related information and the terminal related information, the next operation is performed only if the identifier of the terminal included in the paging message is matched with a previously stored identifier.

Also, the present invention may provide a plurality of data fields that is included in a message when a network transmits the message to a terminal in wireless communication system, wherein the plurality of data fields are stored with at least one of an identifier of the terminal (UE id), a message type, the call related information and the terminal related information.

Namely, the present invention has an effect of efficiently transmitting paging information for a call setup (or establishment), by transmitting call related information from a core network to eNB or UE, which eliminates unnecessary operation performed by radio network in related art, thereby effectively minimizing call setup time.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EVDO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for transmitting paging information in a wireless communication system, the method comprising:
    transmitting a paging message,
    wherein the paging message includes call related information and terminal related information, and
    wherein at least a network or terminal performs an operation based on the call related information and the terminal related information included in the paging message,
    wherein the terminal related information is related to at least a function or capability that is supported by the terminal, and
    wherein the call related information is related to at least a service type, Quality of Service (QoS) information, a target network radio technology, or a target cell.

2. The method of claim 1, wherein the paging message is transmitted by a core network.

3. The method of claim 2, wherein the core network is either a mobility management entity (MME) or a gateway (GW).

4. The method of claim 3, wherein the GW is either a serving GW (sGW) or a packet data network GW (pGW).

5. The method of claim 1, wherein the network is at least an enhanced Node B (eNB), a base station controller (BSC), a radio network controller (RNC) or a Node B (NB).

6. The method of claim 1, wherein the terminal related information indicates a type of radio network technology that is supported by the terminal.

7. The method of claim 6, wherein the radio network technology is at least a GSM (Global System for Mobile communications), a UMTS (Universal Mobile Telecommunications System) or an LTE (Long Term Evolution).

8. The method of claim 1, wherein the terminal related information indicates a maximum uplink transmission rate or a maximum downlink transmission rate.

9. The method of claim 1, wherein the terminal related information indicates whether the terminal supports a voice service or a data service.

10. The method of claim 1, wherein the terminal related information indicates either a maximum amount of buffer in the terminal or a maximum number of channels supported by the terminal.

11. The method of claim 1, wherein the terminal related information indicates a radio resource support amount for a radio bearer setup between the terminal and the network.

12. The method of claim 1, wherein the paging message further includes a plurality of fields to store at least the call related information or the terminal related information.

13. The method of claim 1, wherein the paging message further includes an identifier of the terminal (UE id) or a message type.

* * * * *